Oct. 4, 1966 R. M. SCHERER 3,276,245
DENSITY COMPENSATOR DEVICE
Filed April 22, 1963 6 Sheets-Sheet 1

INVENTOR.
RICHARD M. SCHERER

BY HIS ATTORNEYS.
HARRIS, KIECH, RUSSELL & KERN

Oct. 4, 1966 R. M. SCHERER 3,276,245

DENSITY COMPENSATOR DEVICE

Filed April 22, 1963 6 Sheets-Sheet 2

INVENTOR.

RICHARD M. SCHERER

BY HIS ATTORNEYS.

HARRIS, KIECH, RUSSELL & KERN

INVENTOR.
RICHARD M. SCHERER

BY HIS ATTORNEYS.
HARRIS, KIECH, RUSSELL & KERN

INVENTOR.
RICHARD M. SCHERER
BY HIS ATTORNEYS.
HARRIS, KIECH, RUSSELL & KERN

INVENTOR.
RICHARD M. SCHERER
BY HIS ATTORNEYS.
HARRIS, KIECH, RUSSELL & KERN

INVENTOR.
RICHARD M. SCHERER

BY HIS ATTORNEYS.
HARRIS, KIECH, RUSSELL & KERN

United States Patent Office 3,276,245
Patented Oct. 4, 1966

3,276,245
DENSITY COMPENSATOR DEVICE

Richard M. Scherer, La Mirada, Calif., assignor to Waste King Corporation, Los Angeles, Calif., a corporation of California

Filed Apr. 22, 1963, Ser. No. 276,123
6 Claims. (Cl. 73—30)

This application is a continuation-in-part of my copending application of the same title, Serial No. 187,595, filed April 16, 1962 now abandoned.

This invention relates to computing devices and a method that may be employed to determine and maintain the correct pressure for a gas system to compensate for nonstandard and noncalibrated conditions existing in that system. More particularly the invention provides a density compensator device that may be used, among other places, in conjunction with a meter such as a rotometer to enable the meter to provide a correct mass flow readout. The device and method relieve the observer of the necessity of resorting to mathematical calculations in order to correct for variations in pressure and temperature from calibrated conditions for the particular meter.

The readings of most gas flow meters must be corrected for departure of the metered fluid from conditions for which the meter is calibrated. If temperature or pressure of the fluid differs from calibrated conditions, a mathematical correction must be applied to the reading of the meter before the true mass or energy flow rate is known. It also sometimes occurs in industrial processes that it is necessary to maintain a gas body at a constant density regardless of changes in barometric pressure and ambient temperature. Here again the existing density must be determined, calculations made, and conditions adjusted to return the gas body to its desired density. With the density compensator device and method of the invention, the necessity of laboriously determining the correction to be made is eliminated. The device indicates when the gas body has strayed from the desired density and also indicates the corrective pressure to be applied to return the gas body to its desired density. In the case of a flowing gas stream, a compensating physical adjustment may be readily made by adjustment of pressure through positioning of a suitable valve which may be carried out manually or automatically. The density compensator of the invention may be used to indicate when the degree of adjustment is ample to return the gas body to its original desired density. The use of the density compensator of the inevntion in conjunction with a meter permits that meter to read correctly in mass or energy units of the metered fluid.

The density compensator device and method may be adapted to any meter the readout of which does not depend appreciably on any properties or conditions of the metered gas other than its density and flow, and can provide corrections for various units of measurement such as B.t.u./hour, c.f.m. at standard conditions, pounds per hour, and the like.

The density compensator of the invention in its various forms is laid out in accordance with a design equation, $$P\ (\text{or}\ B+C)=KT,$$

where:

P is the gas pressure absolute of the gas system to be monitored and is equal to the sum of $B+C$, with B being the atmospheric pressure absolute and C the gas pressure gauge of the gas system;

T is the gas temperature absolute of the gas system; and

K is a design constant for a particular gas, the design constant being so selected that it permits computation of the corrective pressure required to give a correct readout in desired units on a meter associated with the gas system with variations in temperature and pressure from calibrated conditions.

The design constant K is equal to $$\frac{P_s}{T_s}XR$$

where:

$P_s$ is the calibrated gas pressure absolute of the gas meter, $T_s$ is the calibrated gas temperature absolute of the gas meter, and R is a factor which is a function of the particular gas being metered, the type of meter being employed, units of calibration of the meter, and an arbitrary sizing factor X. The sizing factor X determines the working pressure or range of the compensation.

All of the various versions of the density compensator of the invention are a physical embodiment of the foregoing design equation. The design equation may be expressed in a rectilinear arrangement or a polar equivalent of the rectilinear arangement. Four rectilinear arrangements are set forth in FIGS. 1*a*, 2*a*, 3*a* and 4*a*. Their counterpart polar arrangements are illustrated in FIGS. 1*b*, 2*b*, 3*b* and 4*b*.

It is apparent from the foregoing design equation that the value of the function R is most important in laying out a design. For metering in volume units at calibrated conditions, R will have the value of X, the sizing factor, where the density compensator is designed to be used with a displacement type meter and a value of X(SG) where the density compensator is to be employed with a diffusion type meter. For metering in mass units, R will have the value $X/SG$ for density compensators for use both with diffusion and displacement type meters. For metering in thermal energy units, density compensators designed to be used with diffusion type meters have an R function with the value of $$X\frac{(SG)}{Q^2}$$

density compensators designed to be used with displacement type meters have an R function with the value of $X/Q$. Q is the heating value of the particular gas to which the R function pertains, expressed in thermal units per volume unit at the calibrated conditions of the meter.

SG is the specific gravity of the particular gas to which the function R pertains. In some versions of the density compensator, several values of R pertaining to different gases, are incorporated in the design, permitting use of the compensator with systems containing the gases so represented.

In one embodiment of the density compensator of the invention, the P variable of the design equation extends along one coordinate axis of the design, with one of the R and T terms extending along the other coordinate axis of the design. The other one of the R and T terms serves as the parameter of the design equation. A pressure display means which may take various forms is positioned along one of the coordinate axes of the design and a temperature display means (again it may take one of several forms) is located along the other coordinate axis of the design, or positioned everywhere equal distance from the coordinate axis. In the latter design the temperature display means of a rectilinear design is substantially parallel to the pressure display means. In case of the corresponding polar arrangement, the temperature display means, while not being parallel to the pressure display means, will everywhere along its length be spaced equal distance from the polar coordinate axis along which the pressure display means lies.

In another form of the density compensator of the invention, the C variable of the design equation extends along one coordinate axis of the design, with one of the B and T terms extending along the other coordinate axis. The other one of the B and T terms serves as the parameter of the design equation. In the latter embodiment of the density compensator, a pressure display means is positioned along one coordinate axis with a temperature or barometric pressure display means located along the other coordinate axis.

The pressure display or readout means for the density compensator of the invention may take various forms, for example a scalar, manometric, or barometric form. The means for introducing the temperature factor into the density compensator may be manual or automatic; for example, a mercury-in-glass thermometer or a vapor phase thermometer suitably incorporated in the particular design. In alternative embodiments, the gas characteristic change required for compensation may be determined automatically by various computers and/or may be produced automatically and continuously by various control devices.

The various objects and advantages of the invention will become more apparent in the following detailed description of preferred practices of the invention considered with the accompanying drawings.

In the drawings:

FIGS. 1*a*, 2*a*, 3*a* and 4*a* show possible arrangements of the density compensator of the invention employing rectilinear coordinates;

FIGS. 1*b*, 2*b*, 3*b* and 4*b* show polar equivalents of the rectilinear arrangements of FIGS. 1*a*, 2*a*, 3*a* and 4*a*, respectively;

Figure 1A:
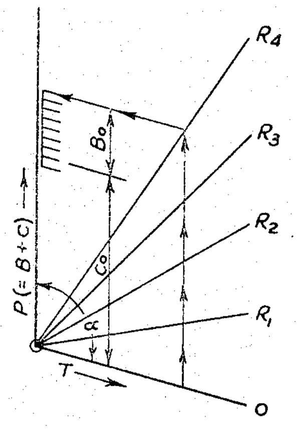
Figures 12, 14:
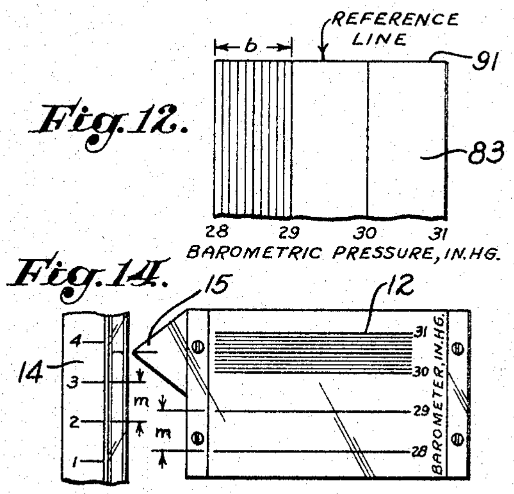
FIG. 12 shows a fixed barometric pressure scale of the device of FIG. 9 which in assembled form underlies the slidable temperature scale.
Figure 15:
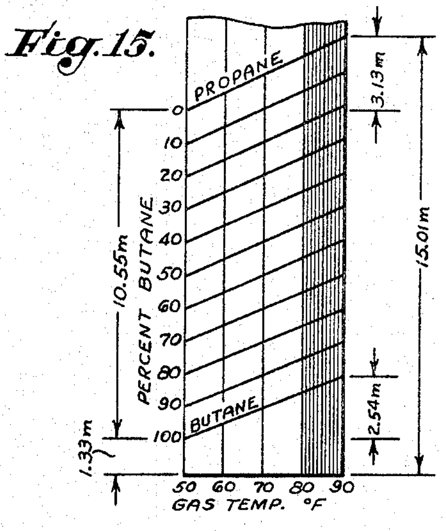
Figure 13:
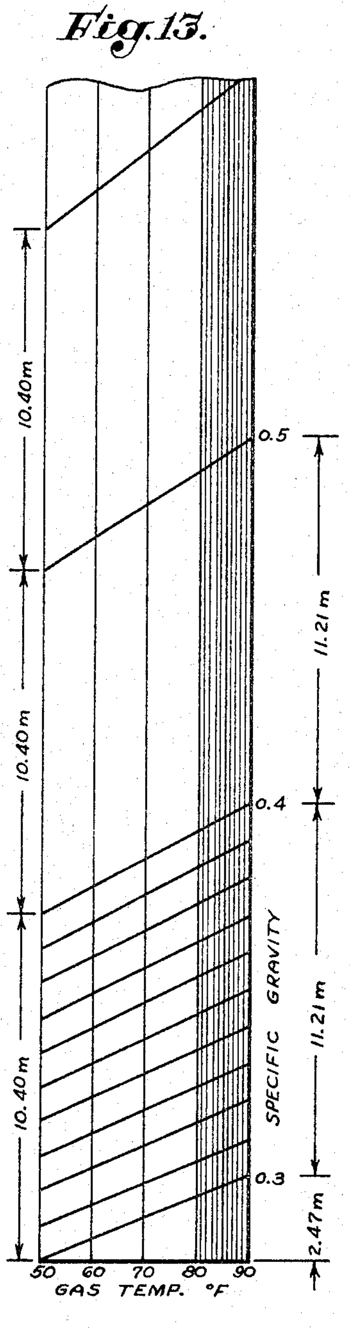
Figure 17:
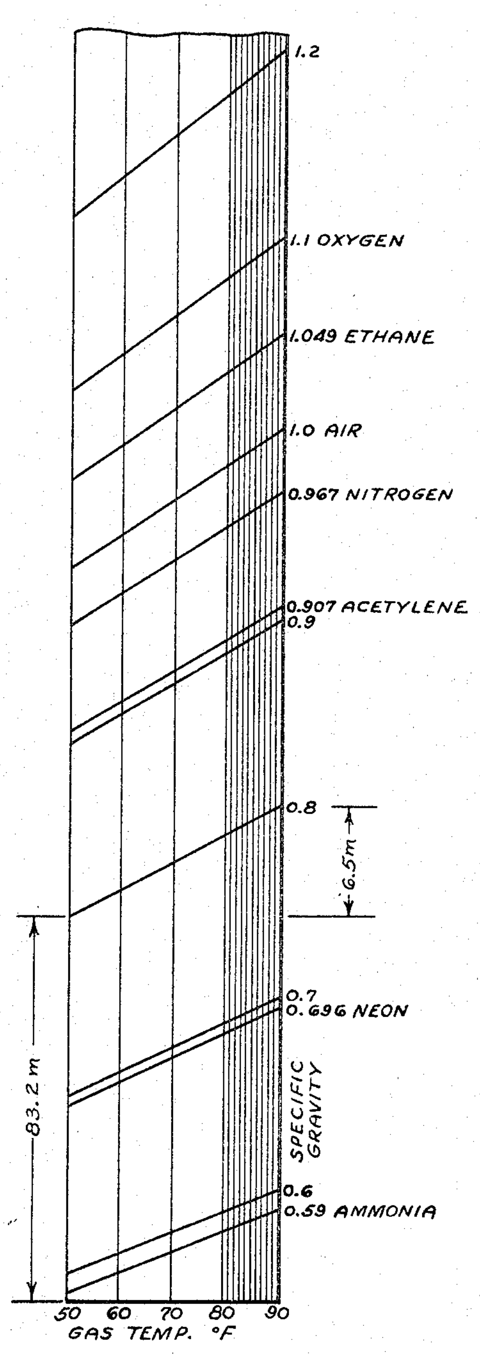
Figure 16:
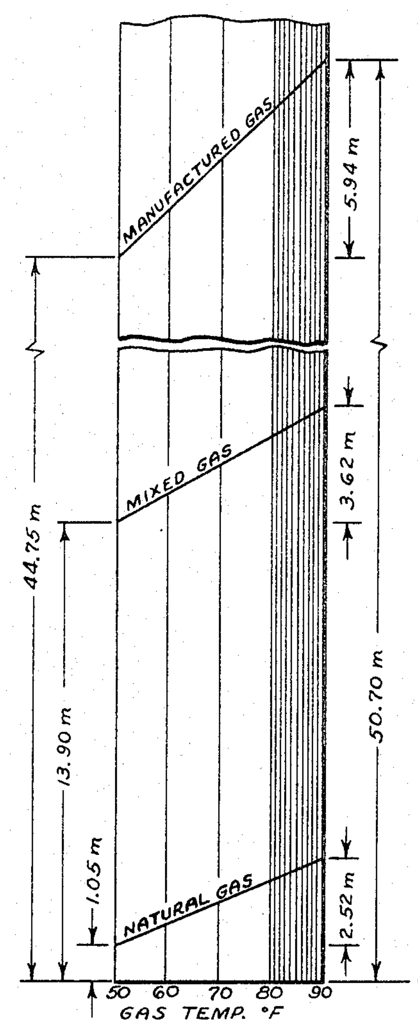

FIGS. 13 and 14 represent the scales of a density compensator laid out in accordance with FIG. 1*a*, designed to be used with a rotometer which will read directly in standard cubic feet per minute on a common scale for gases of varying specific gravities, there being provided a manometric readout and a slidable transparent barometric scale (FIG. 14) interconnecting the manometer and a fixed gas temperature and specific gravity grid (FIG. 13);

FIG. 15 is a fixed scale of another density compensator device of the invention laid out in accordance with the rectilinear arrangement of FIG. 1*a*, designed to be used with a rotometer which will always read directly in B.t.u. per hour on a common scale for propane and butane mixtures of varying ratio, said design having a manometric readout and slidable barometric scale of the general type illustrated in FIG. 14;

FIG. 16 shows another form of the density compensator device of the invention, again laid out in accordance with FIG. 1*a* and designed for lighter-than-air fuel gases to be used with a rotometer which will always read directly in B.t.u. per hour on a common scale for various gases, said device having a manometer readout and a slidable barometric scale of the general type illustrated in FIG. 14; and FIG. 17 shows still another form of the density compensator of the invention laid out in accordance with the rectilinear arrangement of FIG. 1*a*, designed specifically for use with a rotometer which reads directly in cubic feet per minute on a common scale for gases of the specific gravity shown, said density computer having a manometric readout and a slidable barometric scale of the type illustrated in FIG. 14.

The density compensator of the invention may take several forms, and may be laid out in accordance with any one of the four rectilinear arrangements illustrated in FIGS. 1*a*, 2*a*, 3*a* and 4*a*. Each of the four rectilinear arrangements has its counterpart in a polar coordinate system illustrated in FIGS. 1*b*, 2*b*, 3*b* and 4*b*, respectively. The discussion following will be principally with respect to the rectilinear arrangements, although it will be understood that the remarks are generally applicable to the polar equivalents. The subscript "0" and other subscripts to the various B, C and T terms in FIGS. 1 to 4 refer to exemplary values of the respective terms.

With use of the density compensator of the invention, variations in temperature and pressure within a gas system may be adjusted for, to permit correct readout of a meter associated with the system. The density compensator will indicate the proper pressure to which the gas system must be regulated in order to permit the meter to provide a correct readout. It has been pointed out above that gas meters are customarily calibrated to a given temperature and pressure. This being so, any variation in temperature and pressure within the gas system from the calibrated conditions will cause the meter to present an erroneous reading. For this reason a mathematical correction must be applied to the reading of the meter before the true flow rate can be determined. With the use of the density compensator of the invention, it is no longer necessary to make this mathematical calculation. The density compensator provides a corrective pressure factor to which the gas system may be regulated in order to provide a correct readout in desired units on the meter associated with the gas system.

The various forms of the density compensator of the invention incorporate a design laid out in accordance with the equation $P=KT$. In some designs the equation is expressed as $B+C=KT$. P is the gas pressure absolute of the gas system and is equal to the sum of $B+C$, with B being the atmospheric pressure absolute and C the gas pressure gauge of the gas system. In some embodiments the corrective pressure is read out in units of gas pressure absolute (P); and in other compensators the corrective pressure is more conveniently expressed in terms of C, the gas pressure gauge of the gas system. In either case, once the corrective pressure is determined, the gas system is regulated to the new corrective pressure indicated by the density compensator. With this correction, the meter associated with the system will then give a correct readout in desired units.

The design constant K for any density compensator of the foregoing design equation is so selected that it permits computation of the corrective pressure required to give a correct readout in desired units on the meter associated with the gas system with variations in temperature and pressure from calibrated conditions. K is equal to $$\frac{P_s}{T_s} X R$$

where $P_s$ is the calibrated gas pressure absolute of the gas meter and $T_s$ is the calibrated gas temperature absolute of the gas meter. R is a factor which is a function of the particular gas being metered, the type of meter being employed and the units of calibration, and a sizing factor X. The sizing factor X is an arbitrary numerical constant selected to provide a desired working pressure range in the gas system after passage through the meter. It will be appreciated that in use of the density compensator of the invention there is a manipulation of the gas pressure of the system which, if not taken into account, could interfere with the desired working pressure beyond the meter.

A density compensator of a relative density type maintains $d_g/d_s$ at a constant value. In other words, such a device provides or computes the information needed to hold the ratio of the density of the gas to the density of the gas at standard conditions at a constant value. When a relative density compensator of this type is used with a meter, that meter must be calibrated for the particular gas or gases to be passed through it. The meter may be calibrated in various units of flow, mass or thermal energy.

A density compensator of the absolute density type used in conjunction with a meter maintains the density of the gas being metered at a constant value. That is to say regardless of the gas passing through the meter, the corrective pressures which are computed maintain the density of that gas at a constant value. Such a device when used with a meter permits the meter to have a single calibration for any and all gases. Once again any of the various units of calibration may be used.

The term diffusion type meter is used to define a meter which is dependent on the Bernoulli effect. Such meters include venturi, orifices, rotometers and the like. The term displacement meter is used to describe meters which are dependent on moving a fixed volume of gas from one point to another and counting the number of such movements. Displacement meters include piston meters, gear pumps, wet test gas meters and the like. Such meters may be calibrated in any unit of measurement.

As the first step in the layout of a design, the value of the design constant K must be determined. The design constant, it will be recalled, is equal to $$\frac{P_s}{T_s}XR$$

The calibrated gas pressure $P_s$ will normally be standard gas pressure of 30 inches mercury. The calibrated gas temperature $T_s$ will normally be the standard gas temperature of 520 Rankin. Thus, it will appear that the value of the function R is most crucial in determining variations from design to design. Once the value of design constant K for a particular gas is determined, the design is laid out in accordance with one of the rectilinear (or polar) arrangements illustrated in FIGS. 1–4 inclusive. A particular layout may be had by substituting different values of T in the design equation and calculating for the corresponding P values. The P and T values are then plotted to obtain the particular shapes of the curves making up the rectilinear or polar arrangement employed.

Information in the way of temperature and barometric pressure introduced into the density compensator will give the corrective pressure to be applied to the associated gas system in order for the meter to have a correct readout in desired units.

Figure 1B:
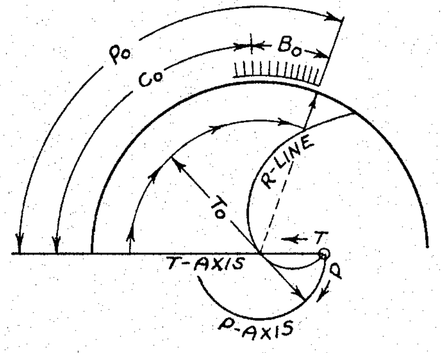
Figure 3B:
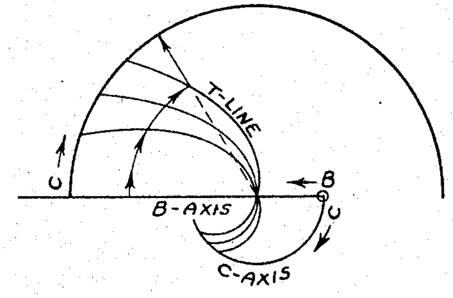
Figure 2B:
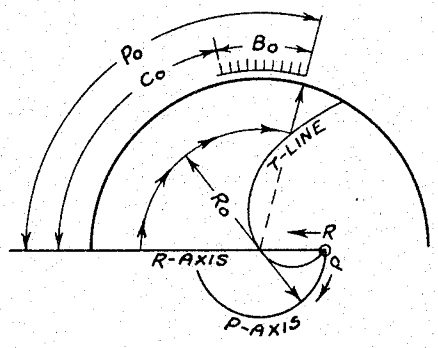
Figure 4B:
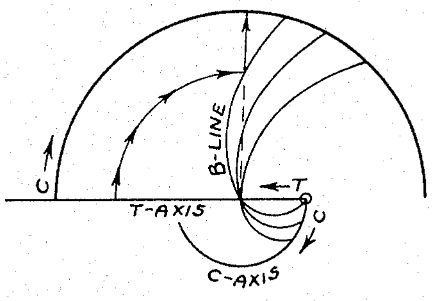

With reference to the rectilinear arrangement of FIG. 1*a* and the polar arrangement of FIG. 1*b*, it will be seen that the density compensator of such a design has the P variable of the design equation extending along one coordinate axis of the design with one of the R and T terms extending along the other coordinate axis. The other one of the R and T terms serves as a parameter of the design equation. In the design of FIG. 1*a*, a pressure display means is positioned along the P axis and a temperature display means which may take various forms extends along the other coordinate axis. The temperature display means, for example, may be either a glass thermometer properly sized and with its degree markings in accordance with the design equation, or, for example, it may be simply a temperature scale appropriately marked off. The pressure display means disposed along the P axis may even be a simple scalar readout, a manometer, or a barometer, whichever form would be most desirable for the particular use. In some applications there would be a single R line; however, as illustrated in FIG. 1*a*, there may be a plurality of R lines.

Figure 2A:
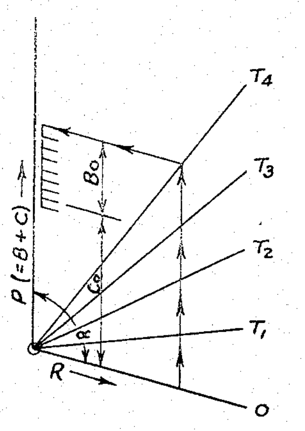

In the rectilinear arrangement of FIG. 2*a*, it will be seen that there has been an interchange of the T and R terms compared with that of FIG. 1*a*. In the design of FIG. 2*a*, a glass thermometer may be placed parallel to the pressure coordinate. The thermometer must be properly sized in order to have its degree markings suitably placed.

Even within a particular rectilinear arrangement such as that of FIG. 1*a*, the density compensator may take varying forms. For instance, in a design where the temperature display means is a scale, the T lines which emanate from the T coordinate axis may be on a fixed scale or be carried by a transparent sliding scale which is movable parallel to the P coordinate axis. The R lines are provided on a fixed scale. In this design the barometric B lines are so located on the sliding scale that when a given B line is placed over a given R–T intersection, the value of the corrective pressure C is given on a fixed scale lying along the P coordinate axis opposite an index line on the sliding scale. Alternatively, the sliding scale may be so formed that when an index line on the sliding scale is placed over a given R–T intersection, the corrective value C is given on the fixed P scale opposite a given B line carried by the sliding scale. The angle $\alpha$ of FIG. 1*a* may be any angle except 0° or 180°.

It will be noted that in the rectilinear arrangements of FIGS. 1*a* and 2*a*, the P variable of the design equation is divided into a function C along the P coordinate axis and into a B function which may be carried by the sliding scale. There is in effect an adding of the B and C functions during the operation of the density compensator. The value C obtained along the P coordinate axis is introduced into the gas system by regulation of its pressure; for example, by manipulation of a suitable valve, to thus restore the gas system to a form where the meter associated therewith will give a correct readout in desired units.

FIGS. 13 and 14 provide an illustration of a density compensator laid out in accordance with rectilinear arrangement of FIG. 1*a* and the design equation. The density compensator of FIGS. 13 and 14 controls the density of the associated gas system as a function of barometric pressure B and absolute temperature T, such that a rotometer or other diffusion meter will always read directly in standard cubic feet (c.f.m.) on a common scale for various gase. It will be appreciated that a rotometer or other meter is ordinarily calibrated for use with a single gas to give a correct readout at calibrated conditions. With the use of the density computer of FIGS. 13 and 14, a rotometer or other meter used in conjunction with the density computer will provide a correct readout in standard c.f.m. on a common scale for various gases. The R value of the instant design equals X(SG) where SG is the specific gravity of a particular gas compared with air at the calibrated conditions. Actually, there are a plurality of R values, a single one for each gas provided for. In the particular embodiment illustrated, the R lines are designated by specific gravities. The R lines could have been equally well designated by naming of different gases.

The fixed scale of FIG. 13, the slidable scale 12 of FIG. 14, and the manometer 14 of FIG. 14 were all laid out in accordance with the design equation $P=KT$ into a rectilinear arrangement as shown in FIG. 1*a*. It has been mentioned that the fixed scale of FIG. 13 carries a plurality of R values, here expressed as specific gravities along the right-hand side of the fixed scale. Temperature lines T emanate from the bottom of the fixed scale and run the length thereof, forming a grid with the sloping specific gravity R lines. In an assembled density computer the transparent slide 12 made of a clear plastic overlies the fixed scale of FIG. 13. The slide 12 carries a barometric scale. Movement of the slide 12 to place a given B line over a given R–T intersection (a temperature-specific gravity intersection) will give a corrective value C on the scale of the manometer 14 opposite a pointer 15 of the sliding scale. Adjustment of the gauge pressure of the gas system to the value C will cause the meter associated with the gas system to give a correct readout in standard c.f.m. Since the manometer 14 is connected directly to the gas system, there is no need for a scalar readout on the manometer because the proper correction can be had by adjusting the pressure of the gas system to cause the manometer level to rise or fall to the level of pointer 15. The value *m* appearing in FIGS. 13 and 14 and similar values of the other figures are derived from a plotting of the design equation to give the rectilinear arrangement of FIG. 1*a* (or other arrangements).

Another embodiment of the density compensator is illustrated in FIG. 15. It will be seen that both embodiments employ the same sliding scale 12 and manometer 14 of the FIG. 14. The density compensator of FIG. 15 has a general resemblance to that of FIGS. 13 and 14, but differs in that it is designed to be used with a meter whose output is expressed in B.t.u. per hour. The density compensator is particularly designed for use with propane or butane, or mixtures of the two gases. The design of the density compensator of FIGS. 14 and 15 is laid out in accordance with the design equation $P=KT$, with K equal to $$\frac{P_s}{T_s}XR$$

The rectilinear arrangement of FIG. 1*a* is followed. In this particular design where the meter with which the density compensator is intended to be used has a readout in B.t.u. per hour, R takes the value of $$X\frac{(SG)}{Q^2}$$

SG is the specific gravity of the particular gas compared with air at the calibrated conditions of 30 inches of mercury and 60° F. (520 Rankin). Q is the heating value of the particular gas (that is, either propane or butane or one of the gas mixtures) in thermal units per volume unit at the calibrated conditions. It will be noted that there are several R lines, one each for propane and butane and the several gas mixtures.

The slope of each of the R lines of FIG. 15 takes into consideration the specific gravity of the gas and its heating value. The temperature display means takes the form of a fixed temperature scale placed along one coordinate axis of the rectilinear arrangement. The manometer 14 of FIG. 14 is disposed along the other coordinate axis of the design. With reference to FIG. 15 it will be seen that the temperature lines emanating from the temperature scale together with the R lines (that is the lines designated as either propane or butane or mixtures thereof) define a grid over which the transparent barometric slide 12 of FIG. 14 is slidably disposed. In operation of the density computer, the barometric transparent slide 12 is moved lengthwise of the fixed scale of FIG. 15 until the applicable barometric pressure line coincides with the intersection of the applicable gas temperature and gas mixture lines. Pointer 15 will then indicate on the manometer the corrective pressure C to which the gauge pressure of the gas system should be adjusted. The manometer 14 is connected to the gas system, and, this being so, the gas pressure of the gas system may be regulated through a suitable valve to bring the liquid level of the manometer 14 into alignment with the pointer 15 of the transparent barometric slide. It will thus be seen that the manometer need not have a scale.

The fixed scale illustrated in FIG. 16 is intended to be used with the sliding scale 12 and manometer 14 of FIG. 14, and may be substituted for the fixed scales of FIGS. 13 and 15 or used in conjunction therewith. The density compensator incorporating the fixed scale of FIG. 16 is designed for use with a meter having a readout in B.t.u. per hour. It is seen, as before, that the use of the density compensator permits the use of the gas meter with various gases under varying conditions of temperature and pressure. The fixed scale of FIG. 16 and the sliding scale 12 and manometer 14 were laid out in accordance with the design equation $P=KT$ and the rectilinear arrangement of FIG. 1*a*. As in the earlier embodiments described, the temperature display means takes the form of a temperature scale which is laid out along one of the coordinate axes of FIG. 1*a*. It will be noted that the fixed scale of FIG. 16 pertains to lighter-than-air fuel gases. As before, the R function used in the layout of the design takes the value of $$X\frac{(SG)}{Q^2}$$

but instead of designating the R lines as specific gravity in this instance, they are identified by naming the gases.

The fixed scale of FIG. 17 is laid out in accordance with the design equation $P=KT$ and the rectilinear arrangement of FIG. 1*a*. It is designed for use with the sliding scale 12 and manometer 14 of FIG. 14. It it intended for use with a meter such as a rotometer which is employed to give a readout in cubic feet per minute at calibrated conditions. Here as in the design of FIG. 13, the R factor has the value of X(SG). The sliding scale 12 of FIG. 14 cooperates with the fixed scale of FIG. 17 to give the required manometric pressure on the manometer 14 in the fashion earlier described.

Figures 9, 10:
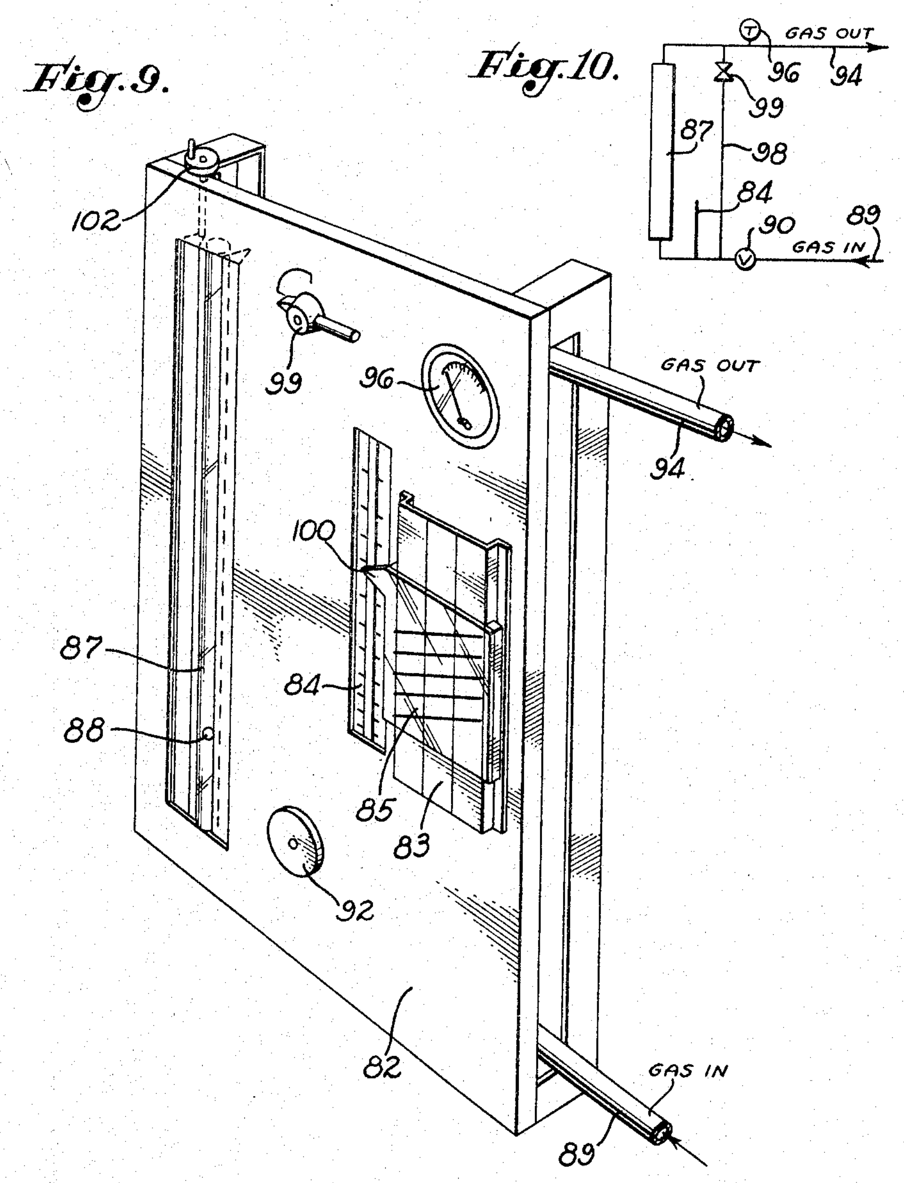
FIG. 9 shows a density compensator of the invention with a manometric readout of corrective pressure, and manual input of temperature and barometric pressure, the design of the computer being laid out in accordance with the rectilinear arrangement of FIG. 3*a*.
FIG. 10 is a line diagram illustrating the use of the density compensator of FIG. 9 in conjunction with a rotometer.
Figure 11:
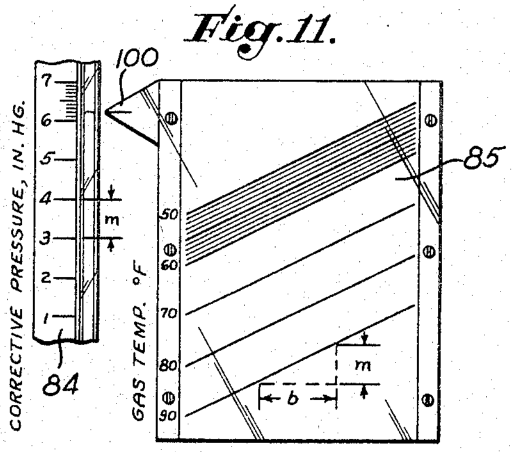
FIG. 11 is a fragmentary representation of the manometer of the device of FIG. 9, in conjunction with a transparent slide member carrying a temperature input scale.

The set of lines on the fixed scale of FIG. 16 can be added to the set of lines on the fixed scale of FIG. 17 if *m* is assigned the same numerical value for each set. The two sets of lines should be made distinguishable as by the use of diffrent colors, different forms (e.g., solid and broken), or the like. Such a dual lined fixed scale permits two types of indications on the scales of the associated rotometer, one giving the correct flow in B.t.u. per hour and the other giving the correct flow in c.f.m. at calibrated conditions. The two rotometer scales could be placed one on either side of the rotometer tube or both on a suitable scale changer 102 as shown in FIG. 9.

The designs shown in FIGS. 13 through 17 have used a sizing factor X with a value of 3.535. At standard conditions of 60° F. and 30 inch mercury for a gas of specific gravity 0.3, the required total pressure P in the system is $$P=X(SG)\frac{P_s}{T_s}T=3.535(0.3)\frac{30}{520}\times 520=31.82 \text{ inches of mercury.}$$

The relative positioning of the two fixed scales may be accomplished by lining up the pointer of the sliding scale 12 and the 1.82 inch (31.82–30) manometer reading of the fixed scale 14 when the 30 inch mercury (on the sliding scale) line, the 60° F. line, and the 0.3 SG value (on the other fixed scale) all intersect. It should be realized that the X is arbitrary and may take any suitable value.

The rectilinear arrangement of FIG. 2*a* differs principally from that illustrated in FIG. 1*a* in that the R and T terms have been interchanged to place the R term or terms along one of the coordinate axes of the design and to employ the T terms as the parameter. The temperature display means may be a fixed scale or it may take the form of a thermometer. In either case the degree lines are spaced apart in accordance with the design equation. The R lines may be placed along the base coordinate axis on a fixed scale or carried on a transparent sliding scale, which sliding scale is provided with barometric lines that extend transversely of the R lines. The P variable of the design equation is placed along the other coordinate axis of the design. The pressure display means positioned along the second coordinate axis of the design may be either a scale, a manometer, or a barometer, depending upon the intended use. Where the barometric scale is placed on the movable transparent slide, the pressure display means will be either a fixed C scale or a manometer. When a given B line (barometric pressure line) is placed over the applicable T–R intersection, the correct value of C is given on the pressure display means, whether it be a fixed scale or manometer. As in the rectilinear arrangement of FIG. 1*a*, the angle $\alpha$ may be any value except 0° or 180°.

The density compensator device of FIGS. 5–8 is laid out in accordance with the design equation $P=KT$ and the rectilinear arrangement of FIG. 2*a*. The compensator is designed for use with rotometer or other meter having a readout in cubic feet per unit of time accurate for a single gas.

The density compensator of FIGS. 5–8 comprises in combination a closed column manometer 20 having a tube 22 and a closed liquid well 24 at the base of the tube with a gas line 26 opening into the head space of the liquid well together with a juxtapositioned liquid column thermometer 28. The scales of the two instruments are so designed with respect to each other that constant density in the associated gas system is obtained with adjustment of the pressure reading of the manometer 20 to match (be level with) the temperature reading of the thermometer 28, i.e., the respective liquid columns of the manometer and thermometer reach the same height when the gas being metered is at the desired constant density. The density compensator of this design, in effect, has a single R line. The closed column manometer may be viewed as having its tube 22 lying along one of the coordinate axes of the rectilinear arrangement of FIG. 2*a*. Actually, the closed manometer is the pressure display means. The thermometer 28 parallels the tube of the manometer with its degree spacings being determined in accordance with the design equation $P=KT$. Here the function R of the design constant K has the value of the sizing factor X, which it will be recalled is an arbitrary numerical constant selected to provide a desired working pressure range in the gas system after passage through the meter. The general design, $P=KT$, will provide the spatial relationship of the temperature and pressure scales of the thermometer and manometer. The equation derived in the following paragraphs gives specific dimensions of the manometer-thermometer combination as to surface area of the manometer well, etc.

In a properly sized manometer-thermometer combination, the ratio of the internal cross-sectional area of the manometer tube to the surace area of the manometer well bears the relationship to a scale factor of the thermometer in accordance with the following equation:

$$\frac{P_s\gamma}{T_s}=m(r'+1)$$

where:

$\gamma$ is the ratio of the desired density to the density of the gas at calibrated conditions of temperature and pressure which most often will be standard conditions;

$P_s$ is the standard calibrated absolute pressure;

$T_s$ is the standard calibrated absolute temperature;

$r'$ is the ratio of the internal cross-sectional area of the manometer tube to the surface area of liquid in the manometer well; and $m$ is the scale factor of the thermometer in linear units per degree of temperature.

The head space of the liquid well 24 of the closed liquid column manometer 20 is connected by line 26 to the gas system being monitored. It will be seen from the above equation that because of the presence of the desired density as a factor in the density ratio $\gamma$ a particular thermometer-manometer combination is limited to use with a gas having a particular specific gravity; if the gas it to be maintained at a different constant density, it will be necessary to redesign the density compensator to accommodate the change in the $\gamma$ term as the result of the change in the desired density factor of that term. A density compensator of this type may be used with any gas regardless of its chemical make-up, provided the density ratio or the specific gravity of the gas is the same as that for which the density compensator is designed.

Figure 5:
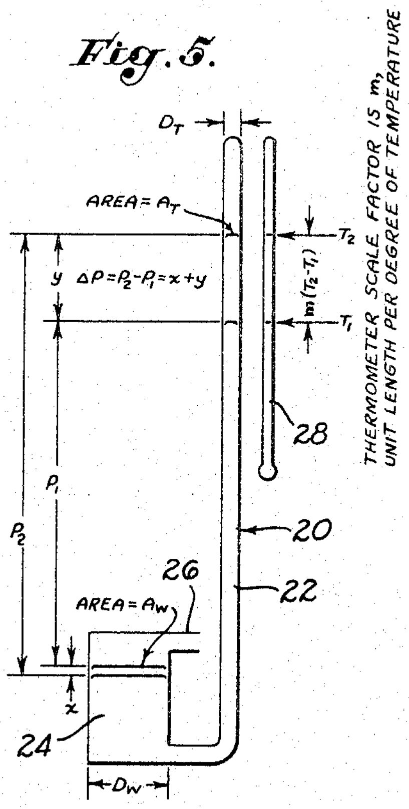
FIG. 5 is a schematic diagram of a density compensator of the invention employing a glass thermometer and barometer laid out in accordance with the rectilinear arrangement of FIG. 2*a*.

With reference to FIG. 5 and the following equations, the derivation of the equation $$\frac{P_s\gamma}{T_s}=m(r'+1)$$

for the sizing of the thermometer and manometer of the density compensator may be more fully understood.

Defining $$\gamma=\frac{d}{d_s}$$

which $\gamma$ must be a constant if a gas body is to maintain a constant density with variations in temperature and pressure, where $d$ is the desired density $d_s$ is the density at standard temperature and pressure (e.g., $P=30''$ Hg; $T=520°$ Rankin)

From the gas laws, it is known that $$d=\frac{M}{V}=\frac{P}{R''T}=k''\frac{P}{T}$$

where:

$M$=number of weight moles, e.g., pound moles, gram moles $V$=total volume $P$=absolute pressure $T$=absolute temperature $R''$=a constant applicable to all perfect gases, the numerical value of which depends on the particular units of temperature, volume, and pressure used $k''$=reciprocal of R''

$$k''=d_s\frac{T_s}{P_s}$$

where:

$T_s$=standard absolute temperature e.g., 520° R.

$P_s$=standard absolute pressure, e.f., 30'' Hg $$d=\frac{k''P}{T}$$

substituting $$d_s=\frac{T_s}{P_s}\text{ for }k''$$

then $$d=d_s\frac{T_s}{P_s}\times\frac{P}{T}$$

$$\frac{d}{d_s}=\gamma=\frac{T_s}{P_s}\times\frac{P}{T}=\frac{520P}{30T}$$

As seen in FIG. 5, the distance of the temperature change of the thermometer and $y$, the distance of the pressure change of the mercury in the tube of the manometer, are the same (where the density remains constant). Therefore, $$y=m(T_2-T_1) \qquad (1)$$

Since the mercury or other liquid used in the manometer is substantially incompressible, the volume change in well 24 of the manometer 20 and in the tube 22 is the same; hence $$A_Wx=A_Ty$$

where $A_W$ is the area of the well and $A_T$ is the area of the tube, or $$\frac{x}{y}=\frac{A_T}{A_W} \quad (2)$$

Furthermore $$P_2=P_1+x+y$$

or $$P_2-P_1=x+y \quad (3)$$

Dividing (3) by (1)

$$\frac{P_2-P_1}{T_2-T_1}=m\left(\frac{x+y}{y}\right)$$

$$\frac{P_2-P_1}{T_2-T_1}=m\left(\frac{x}{y}+1\right)$$

and substituting (2)

$$\frac{P_2-P_1}{T_2-T_1}=m\left(\frac{A_T}{A_W}+1\right)$$

$$\frac{P_2-P_1}{T_2-T_1}=m\left(\frac{A_T+A_W}{A_W}\right) \quad (4)$$

From the Gas laws:

$$\frac{P}{T}=\frac{P_s\gamma}{T_s}=\frac{\Delta P}{\Delta T}=\frac{P_2-P_1}{T_2-T_1}=m\left(\frac{A_T+A_W}{A_W}\right)=m\left(\frac{A_T}{A_W}+1\right)$$

In further simplification, defining $$r'=\frac{A_T}{A_W}$$

the design equation becomes $$\frac{P_s\gamma}{T_s}=m(r'+1) \quad (5)$$

when $\gamma$ is the ratio of the desired density to the standard density of the gas $m$ is the scale factor of the thermometer in linear units per degree $r'$ is the ratio of the area of the tube ($A_T$) to the area of the well ($A_W$) of the manometer.

Where the pressure is expressed in inches mercury and the temperature in degrees Fahrenheit the design equation becomes $$\frac{30\gamma}{520}=m(r'+1)$$

wherein $m$ is the scale factor of the thermometer in inches per degree Fahrenheit.

Figure 7:
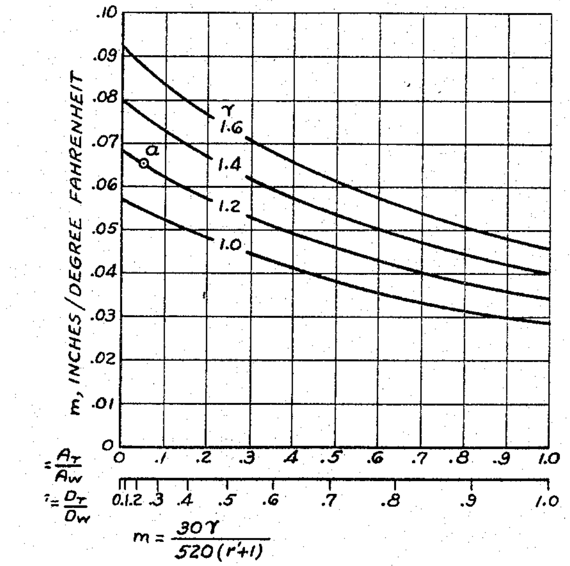
FIG. 7 is a plot of design factors used in construction of the density compensator of FIG. 5.

The equation immediately preceding is shown graphically in the curves of the plot of FIG. 7. It will be noted that several different $\gamma$ values have been plotted.

Figure 8:
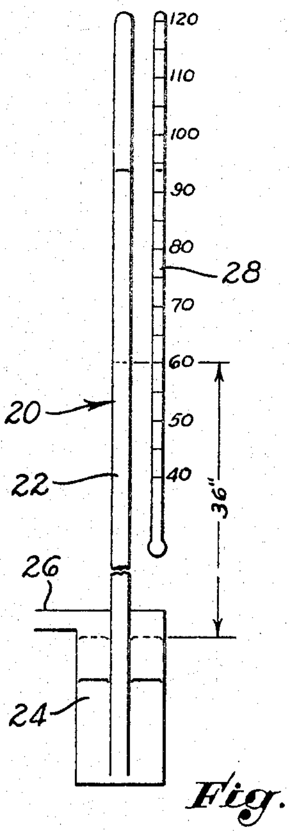
FIG. 8 is a scale drawing of a density compensator of the type illustrated in FIG. 5, designed around point *a* of the plot of FIG. 7.

FIG. 8 is a scale drawing of a mercury-in-glass density compensator having reasonably practical dimensions on a design based on "point *a*" of the plot of FIG. 7. The design has the following values $R$=.05
$\gamma$=1.2
$m$=.06593
$A_W$=.1 sq. in. (surface area of mercury within the manometer well)

As seen in FIG. 8, at 60° F. the distance between the 60° mark of the thermometer and the level of the mercury in the manometer is 36″. By employing the foregoing design relationship the constant density indicating device illustrated will, with the leveling of the liquid columns of the manometer and thermometer, result in a gas having the desired density ($1.2d_s$). As is evident from the plot of FIG. 7, there are many other choices available which will provide a device having reasonably practical dimensions.

Figure 6:
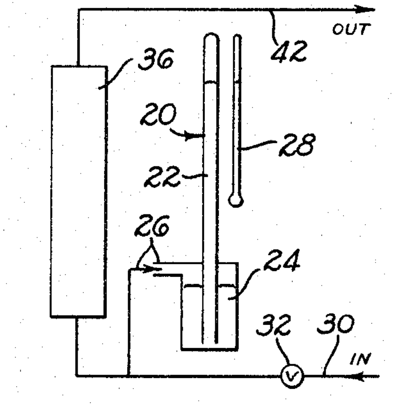
FIG. 6 is a line diagram illustrating the use of the density compensator of FIG. 5 in conjunction with a rotometer.

There is illustrated in FIG. 6 a density compensator of the invention coupled to a gas line 30 between a valve 32 and a rotometer 36. The device of the invention may be mounted on a board. The gas leaving the rotometer 36 leaves via a line 42. If desired, a proportion of the gas may be bypassed around the rotometer 36. The manometer and thermometer combination of FIG. 6 has been sized in accordance with the Equation 5 discussed above. The device of the invention, as explained earlier, is designed to permit maintaining of the gas flowing through line 30 at a constant predetermined density value. If the gas stream strays from the predetermined density value, this variation is immediately apparent on the density compensator by the liquid columns not reaching the same height. The gas stream may be returned to the desired constant density value by manipulation of valve 32 to vary the pressure of the gas stream. When the desired density value has returned, the liquid columns of the thermometer 28 and the manometer 20 will reach to the same height.

Figure 3A:
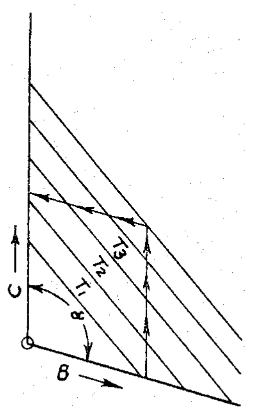

A third possible rectilinear arrangement for the layout of the density compensator of the invention is illustrated in FIG. 3*a*. This arrangement, as are the others, is laid out in accordance with the equation $P=KT$. More properly speaking, the layout is made in accordance with the equation $B+C=KT$. B is the atmospheric or barometric pressure absolute and T is the gas temperature absolute of the gas system. C is gas pressure gauge. K, as before, is the design constant and so selected that it permits computation of the corrective pressure C required to give a correct readout in desired units on a meter associated with the gas system. As before, K is equal to $$\frac{P_s}{T_s}XR$$

and R is a factor which is a function of the particular gas being metered, the type of meter being employed, units of calibration, and sizing factor X. The C variable of the design equation extends along one coordinate axis of the design, with the B variable extending along the other coordinate axis. The T terms serve as the parameter of the design equation.

A density compensator laid out in accordance with the rectilinear arrangementof FIG. 3*a* may take several forms. For example, the B lines may be carried on a fixed scale with the B lines emanating from the B axis of FIG. 3*a* and returning parallel to C axis. The B lines may be carried by a sliding scale formed of transparent material which scale moves parallel to the C axis. The T lines are carried by a fixed scale and the sliding scale is provided with an index line, so located that when the index line is placed over a given B–T intersection, the correct value of C is indicated on the fixed scale opposite the index line of the sliding scale. In another version, where the B lines are on a fixed scale, the T lines may be carried by the movable transparent slide and an index line placed on the fixed scale. In this version, when a given T line is placed over the intersection of a given B line with the index line of the fixed scale, the correct value of C is indicated on the fixed scale opposite an index line of the sliding scale. In this version, the angle $\alpha$ may be any angle except 0° or 180°.

The density compensator illustrated in FIGS. 9–12 is laid out in accordance with the design equation of $B+C=KT$ and the rectilinear arrangement illustrated in FIG. 3*a*. The density compensator of this embodiment is mounted on the board 82 and includes a fixed barometric pressure scale 83, a manometer 84 arranged side-by-side with the fixed scale 83, and a slidable transparent scale 85 provided with a series of gas temperature lines. The mounting panel 82 also carries a tapered tube rotometer 87 having a rotometer float 88. A gas in-line 89 to the base of the rotometer 87 has a valve 90 which may be adjusted by a gas pressure regulating handwheel 92 on the face of the mounting panel. The manometer 84 is connected to the gas in-line 89 immediately preceding the rotometer 87. The top of the rotometer 87 connects to a gas out-line 94 having a temperature sensing device 96. The particular embodiment illustrated has a bypass line 98 and a valve 99 around the rotometer 87 to extend the range of flow measurement.

The density compensator of FIGS. 9–12 is specifically designed to permit maintaining the density of the gas system at the same value as existed at the calibrated conditions of temperature and pressure. The R function of the design has the value of the sizing factor X. The reference line 91 of the fixed scale 83 is located opposite the three inch line of manometer 84, this device being calibrated.

The density compensator is used in the following fashion. The slidable transparent scale 85 is moved to place the applicable temperature line over the existing barometric pressure at the reference or calibration line 91 of the fixed scale 83. A pointer 100 of the transparent slide 85 will then point to a level of the manometer 84 to which the manometer liquid must be adjusted if the density of the gas of the system is to be the same as the density of the gas under calibrated conditions. The adjustment is readily made by turning the handwheel 92 until the liquid level of the manometer aligns with the pointer 100. The manometer scale need not be graduated, although it is customarily done.

By providing several rotometer scales and a scale changer 102, the density compensator of FIGS. 9–12 may be used with different gases, there being provided a rotometer scale for each gas. The slope of the temperature lines of this embodiment is the reverse of FIG. 3*a* because the temperature lines of the present embodiment are on a movable transparent scale in contradiction to those of FIG. 3*a* which are stationary.

Figure 4A:
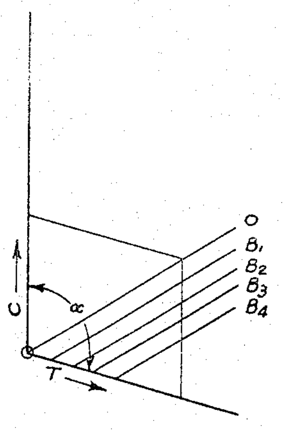

A fourth possible rectilinear arrangement is illustrated in FIG. 4*a*. This arrangement, as the others, is laid out in accordance with equation $P=KT$. More exactly speaking, the layout is made in accordance with the equation $B+C=KT$. B is the atmospheric or barometric pressure absolute and T is the gas temperature absolute of the gas system. C is the gas pressure gauge. K is defined as before. The C variable of the design equation extends along one coordinate axis of the design, with the T variable extending along the other coordinate axis. The B terms serve as the parameter of the design equation of this embodiment.

A density compensator laid out in accordance with the rectilinear arrangement of FIG. 4*a* may take several forms. For example, the T lines may be carried on a fixed scale with the T lines emanating from the T axis of FIG. 4*a* and running parallel to the C axis. The T lines may, alternatively, be carried by a sliding scale formed of transparent material which scale moves parallel to the C axis. In such an embodiment, the B lines are carried by a fixed scale and the sliding scale is provided with an index line, so that when the index line is placed over a given B–T intersection, the correct value of C is indicated on the fixed manometric scale opposite the index line of the sliding scale. In another version, where the T lines are on a fixed scale, the B lines are carried by the movable transparent slide and an index line placed on the fixed scale. In this version, when a given B line is placed over the intersection of a given T line with the index line of the fixed scale, the correct value of C is indicated on the fixed scale opposite an index line of the sliding scale. In this version, as in the other embodiments, the angle $\alpha$ may be any angle except 0° or 180°.

Although exemplary embodiments of the invention have been disclosed herein for purposes of illustration, it will be understood that various changes, modifications, and substitutions may be incorporated in such embodiments without necessarily departing from the spirit of the invention as defined by the claims which follow.

I claim:

1. A density compensator providing for the determination of proper corrective pressure in a gas system to compensate for variations in temperature and barometric pressure from calibrated conditions to permit correct readout of a meter associated with said gas system, said density compensator comprising:

a planar device having a first and second coordinate axis defining a chart, said chart being further characterized by having a pressure term extending along said first axis and a temperature term positioned along said second axis, pressure and temperature lines emanating respectively from said pressure and temperature terms defining a series of intersecting spaced lines, pressure display means positioned in cooperative relation with said pressure term and temperature display means positioned in cooperative relation with said temperature term, said chart further comprising a plurality of additional lines emanating from a common point on said chart which together with the temperature lines define a fixed grid;

a movable barometric scale means formed of transparent material overlying at least part of said grid and movable in a direction paralleling the length of said pressure display means and carrying a pointer means cooperating with said pressure display means to indicate the corrective pressure to be applied to the gas system to obtain a correct readout in desired units on the meter associated with said gas system, said barometric scale means being so sized that when a given barometric pressure line is placed over a given intersection of lines on the grid, the corrective pressure is indicated on said pressure display means, whereby said density compensation is obtained in accordance with the equation $$P=KT$$

where

P is the gas pressure absolute of the gas system and is equal to the sum of $B+C$, with B being the atmospheric pressure absolute and C the gas pressure gauge of said gas system;

T is the gas temperature absolute of the gas system; and

K is a constant for a particular gas, the constant being so selected that it permits computation of the corrective pressure required to give correct readout in desired units on the meter associated with said gas system with variations in temperature and pressure from calibrated conditions, said K being equal to $$\frac{P_s}{T_s}XR$$

where $P_s$ is the calibrated gas pressure absolute of the gas meter, $T_s$ is the calibrated gas temperature absolute of the gas meter, and R is a factor which is the function of the particular gas being metered, type of meter employed and units of calibration, and a sizing factor X, said sizing factor X being an arbitrary numerical constant selected to provide a desired compensation range.

2. A density compensator in accordance with claim 1 wherein R has the value of X.

3. A density compensator in accordance with claim 1 wherein R has the value of $X/SG$, where SG is the specific gravity of said particular gas.

4. A density compensator in accordance with claim 1 wherein R has the value of $$X\frac{(SG)}{Q^2}$$

where

SG is the specific gravity of said particular gas and

Q is the heating value of said particular gas in thermal units per volume unit at the calibrated conditions.

5. A density compensator in accordance with claim 1 wherein R has the value of $X/Q$, where Q is the heating value of the particular gas in thermal units per volume unit at the calibrated conditions.

6. A density compensator in accordance with claim 1 wherein R has the value $X(SG)$, where SG is the specific gravity of said particular gas.

References Cited by the Examiner

UNITED STATES PATENTS

| | | | |
|---|---|---|---|
| 1,824,305 | 9/1931 | Sillers et al. | 73—30 |
| 1,860,516 | 5/1932 | Thomas et al. | 137—2 |
| 1,911,853 | 5/1933 | Silcox | 73—30 |
| 1,933,283 | 10/1933 | Schwartz | 235—61 X |
| 2,037,637 | 4/1936 | Lingo | 73—336 |
| 2,194,041 | 3/1940 | Woodling | 73—336 |
| 2,274,290 | 2/1942 | Barnhart | 73—336 |
| 2,396,574 | 3/1946 | Hopkins | 137—2 |
| 2,470,495 | 5/1949 | Kohn et al. | 235—61 |
| 2,844,963 | 7/1958 | Stewart | 73—233 |
| 2,861,453 | 11/1958 | Gehre | 73—233 |
| 2,932,199 | 4/1960 | Rueger | 73—335 |

RICHARD C. QUEISSER, *Primary Examiner.*

J. FISHER, *Assistant Examiner.*

UNITED STATES PATENT OFFICE

CERTIFICATE OF CORRECTION

Patent No. 3,276,245 October 4, 1966

Richard M. Scherer

It is hereby certified that error appears in the above numbered patent requiring correction and that the said Letters Patent should read as corrected below.

Column 1, line 49, for "inevntion" read -- invention --; column 2, line 5, column 4, line 72, column 5, line 44, column 7, line 36, column 12, line 35, and column 14, line 53, the expression, each occurrence, should appear as shown below instead of as in the patent:

$$\frac{P_s}{T_s} \times R$$

column 2, line 40, after the expression insert a semicolon; column 6, line 56, for "gase" read -- gases --; column 7, line 28, before "Fig. 14" strike out "the"; column 8, line 30, for "It it" read -- It is --; column 9, line 17, before "rotometer" insert -- a --; column 10, line 3, for "it" read -- is --; line 49, for "e.f." read -- e.g. --; column 11, line 27, the expression should appear as shown below instead of as in the patent:

$$m\left(\frac{A_T}{A_W}+1\right)$$

column 12, line 38, before "sizing" insert -- a --; line 47, for "returning" read -- running --.

Signed and sealed this 29th day of August 1967.

(SEAL)
Attest:

ERNEST W. SWIDER
Attesting Officer

EDWARD J. BRENNER
Commissioner of Patents